(12) United States Patent  
Alexander

(10) Patent No.: US 7,640,723 B2
(45) Date of Patent: Jan. 5, 2010

(54) ENGINE WITH FUEL/LUBRICANT SUPPLY SYSTEM FOR BEARING LUBRICATION

(75) Inventor: Eric J. Alexander, San Diego, CA (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 778 days.

(21) Appl. No.: 11/305,608

(22) Filed: Dec. 16, 2005

(65) Prior Publication Data

US 2007/0137217 A1     Jun. 21, 2007

(51) Int. Cl.
*F02C 7/06* (2006.01)

(52) U.S. Cl. ................... 60/39.08; 184/6.11

(58) Field of Classification Search ........... 60/39.08, 60/39.461, 736; 184/6.11
See application file for complete search history.

(56) References Cited

U.S. PATENT DOCUMENTS

| | | | | |
|---|---|---|---|---|
| 2,767,691 A * | 10/1956 | Mengelkamp et al. | ...... | 123/1 R |
| 3,226,322 A * | 12/1965 | Fuller | ...... | 508/432 |
| 3,807,377 A * | 4/1974 | Hirschler et al. | ...... | 123/575 |
| 3,843,534 A * | 10/1974 | Gates et al. | ...... | 508/337 |
| 3,906,717 A * | 9/1975 | Matthews | ...... | 60/39.08 |
| 4,346,689 A * | 8/1982 | Neely | ...... | 123/575 |
| 5,568,984 A * | 10/1996 | Williams | ...... | 384/475 |
| 6,079,198 A * | 6/2000 | Prowse et al. | ...... | 60/776 |
| 6,532,918 B1 * | 3/2003 | Mang et al. | ...... | 123/73 AD |
| 7,216,473 B1 * | 5/2007 | McArthur et al. | ...... | 60/39.08 |
| 7,487,762 B2 * | 2/2009 | Kaneko | ...... | 123/508 |
| 2005/0058016 A1 * | 3/2005 | Smith et al. | ...... | 366/152.1 |
| 2007/0028589 A1 * | 2/2007 | Alexander et al. | ...... | 60/39.08 |

* cited by examiner

*Primary Examiner*—Michael Cuff
*Assistant Examiner*—Phutthiwat Wongwian
(74) *Attorney, Agent, or Firm*—Stephen G. Mican

(57) ABSTRACT

A fuel delivery system for a gas turbine engine that delivers fuel to a combustor of the engine and lubricates bearings of the engine with fuel, comprising: a tank for storing the fuel; a pump for delivering a continuous flow of fuel from the tank to the combustor by way of a combustor inlet stream and the engine bearings by way of a bearing lubrication stream; a pressurized container for storing fuel lubrication additive under pressure; and a flow valve for controlling flow of fuel lubrication additive that flows from the pressurized container into the bearing lubrication inlet stream to mix with the fuel delivered to the engine bearings.

30 Claims, 3 Drawing Sheets

ENGINE WITH FUEL/LUBRICANT SUPPLY SYSTEM FOR BEARING LUBRICATION

FIELD OF THE INVENTION

The invention relates to an engine that uses high-density hydrocarbon fuel to lubricate its bearings, and more particularly to an engine that has a lubricant mixed with its fuel for bearing lubrication.

BACKGROUND OF THE INVENTION

Some engines utilise a high-density hydrocarbon propellant fuel that typically comprises exo-tetrahydrodicyclopentadiene. The engines that use such fuel are typically of the miniature gas turbine or turbojet type with approximately 150 lb-f thrust or less. They generally power airborne vehicles of the single use or expendable type, such as reconnaissance drones, cruise missiles, decoys and other weaponry, including air-launched and ground-launched weapon systems. Such engines provide greatly extended range compared to conventional solid fuel rocket engines in such vehicles.

Military Standard MIL-P-87107 describes such a high-density hydrocarbon fuel for gas turbine and turbojet engines. A common name known in the industry and military fuel depots for this fuel is JP-10. JP-10 is becoming predominant in the military for missile and aircraft applications due to its favourable properties, which include high density and chemical stability, thereby providing extended vehicle flight range as well as long-term storage.

It is advantageous to use the fuel as a lubricant for the engine in such expendable vehicles because it eliminates the cost and weight of an independent lubrication supply system. However, JP-10 as generally manufactured is a poor lubricant for bearings in the miniature gas turbine engines that are used in such expendable vehicles. A fuel additive known as tricresyl phosphate (TCP) added to JP-10 may make JP-10 suitable as a lubricant for miniature gas turbine engine bearings.

It is convenient for the manufacturer of expendable vehicles to add TCP to JP-10 when expendable vehicles when the manufacturer fuels the vehicles at the factory. However, since the military and prime contract customers use JP-10 fuel for numerous applications, it is logistically more practical for military and prime contractor end users to use a single storage tank of pure JP-10. In addition, end users are reluctant to mix TCP with JP-10 for unique applications.

SUMMARY OF THE INVENTION

The invention comprises a fuel lubrication additive injection system for fuel-lubricated gas turbine engines that utilises high-pressure air developed by the engine to transfer stored fuel lubricant additive into the engine fuel stream that lubricates engine bearings.

Generally, the invention comprises a fuel delivery system for an engine that lubricates its bearings with fuel, comprising: a tank for storing the fuel; a pump for delivering fuel from the tank to the engine bearings; a pressurised container for storing fuel lubrication additive under pressure; and a flow valve for controlling flow of fuel lubrication additive that flows from the pressurised container to mix with the fuel delivered to the engine bearings.

DETAILED DESCRIPTION OF THE INVENTION

Figure 1:
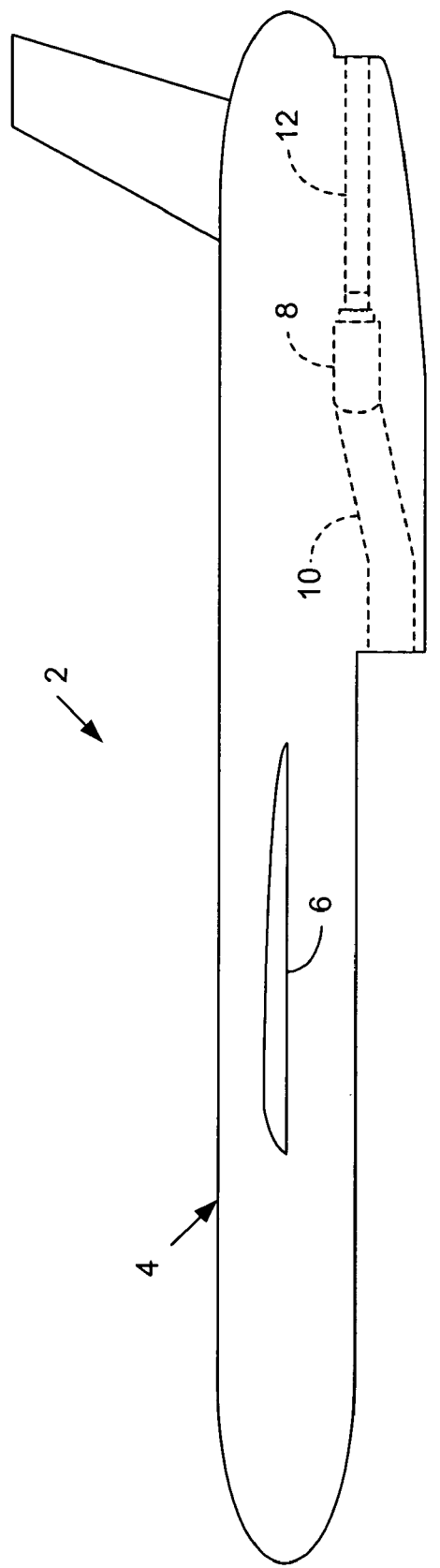
FIG. 1 is a side view of an airborne vehicle that is suitable for incorporating the invention.

FIG. 1 is a side view of an airborne vehicle 2 that is suitable for incorporating the invention. The vehicle 2 comprises an airframe 4 with one or more aerodynamic surfaces 6. The vehicle 2 also comprises a propulsion engine 8, typically of the gas turbine or turbojet type. The engine 8 mounts within or to the vehicle 2. In FIG. 1, for purposes of illustration the engine 8 mounts within the vehicle 2, as shown in dashed line. An intake 10, shown in dashed line, supplies ambient air to the engine 8. An exhaust pipe 12, shown in dashed line, exhausts the thrust of the engine 8 to propel the vehicle 2.

Figure 2:
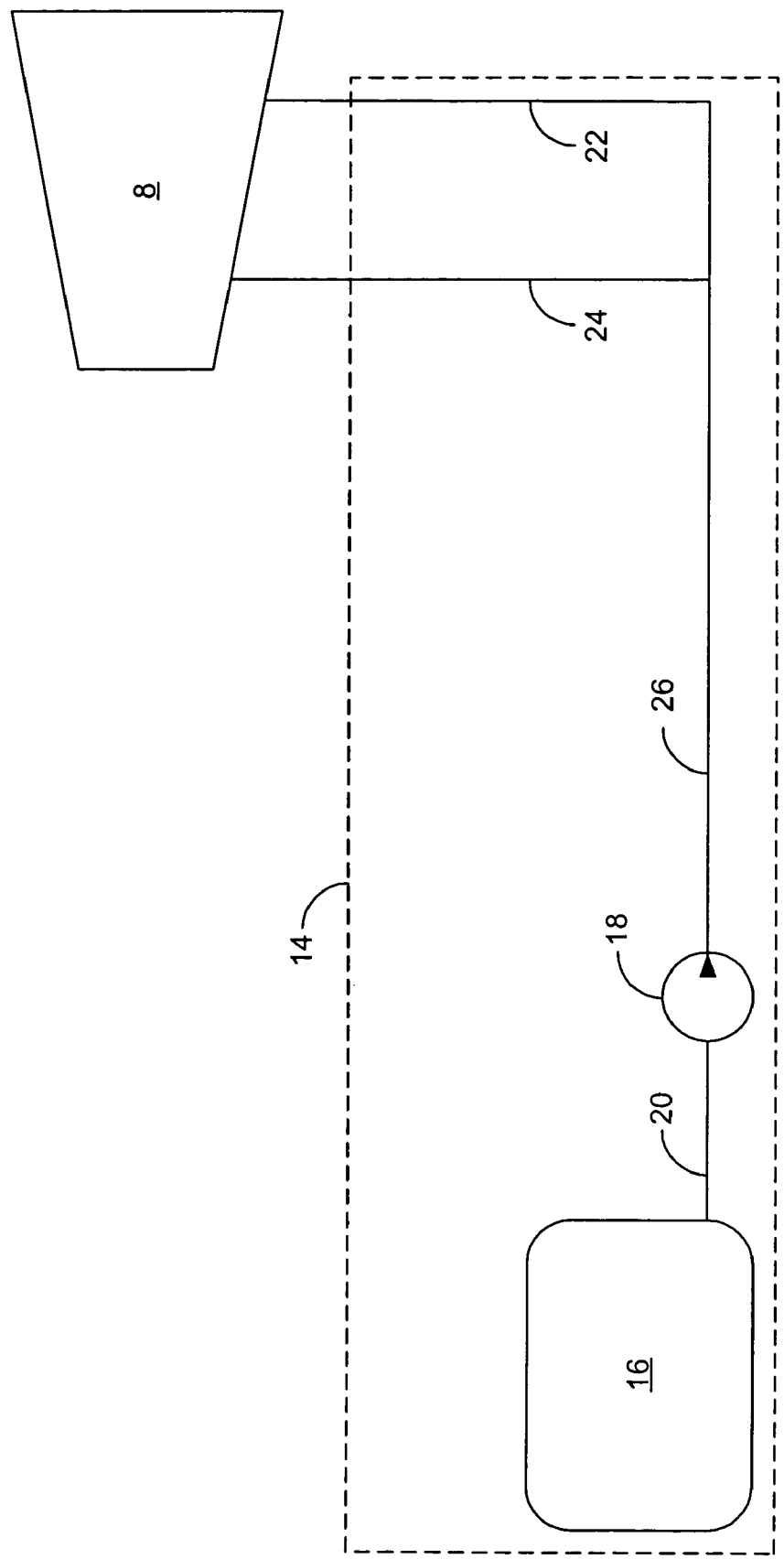
FIG. 2 is a schematic diagram of a fuel delivery system for a gas turbine engine shown in FIG. 1 according to the prior art.

FIG. 2 is a schematic diagram of a prior art fuel delivery system 14, shown in dashed line, for the engine 8 described above in connection with FIG. 1. The fuel delivery system 14 comprises a fuel tank 16 that stores fuel for the engine 8, such as JP-10. The fuel delivery system 14 also comprises a fuel pump 18 that transfers the fuel from the tank 16 by way of a tank outlet line 20 to a combustor inlet line 22 that supplies a combustor (not shown) for the engine 8 and to a bearing lubrication inlet line 24 that supplies bearings (not shown) for the engine 8 by way of a pump outlet line 26.

Figure 3:
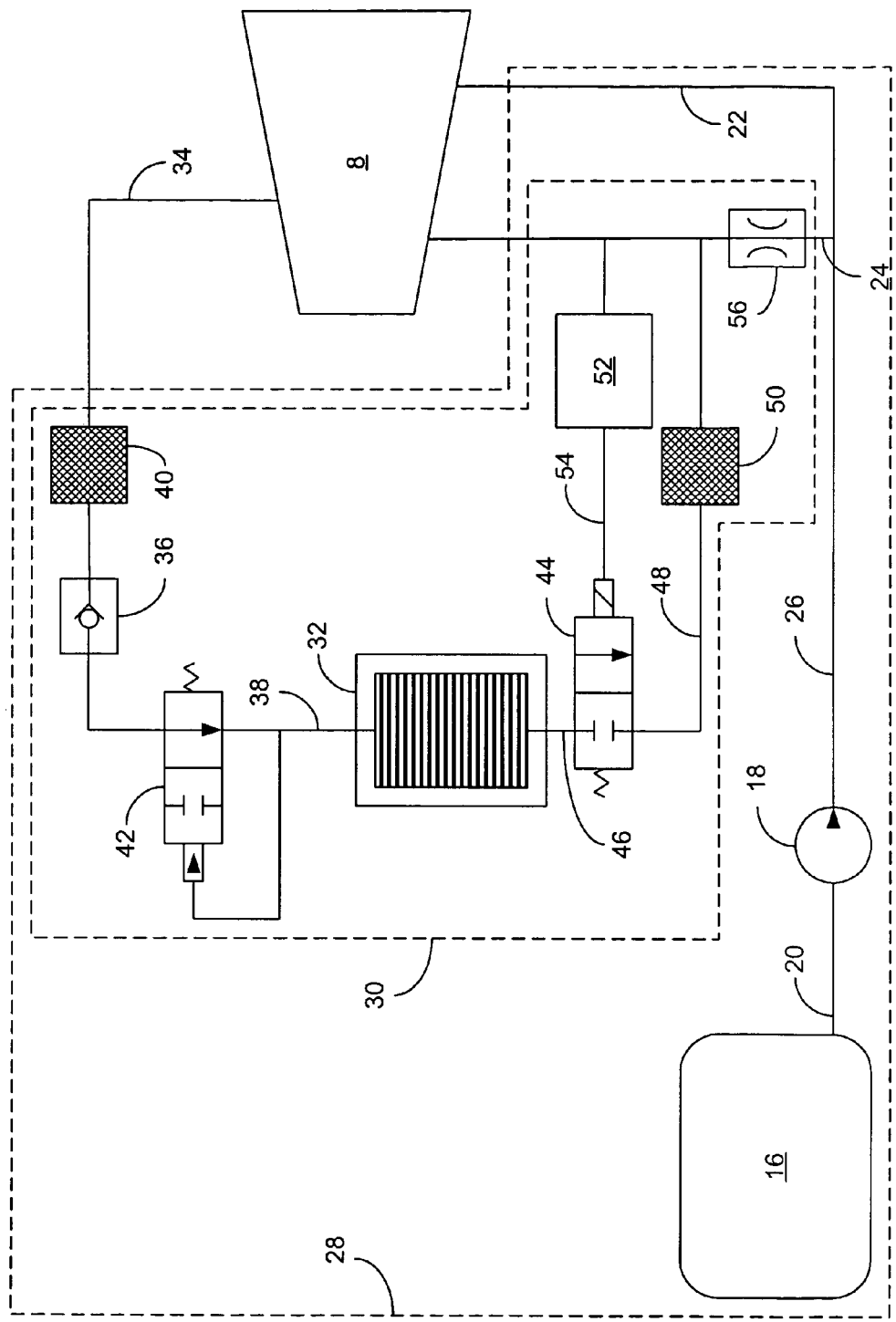
FIG. 3 is a schematic diagram of a fuel delivery system for a gas turbine engine according to the invention.

As described above, the prior art fuel delivery system 14 is not satisfactory for an engine 8 when the tank 16 supplies pure JP-10 fuel, since JP-10 has poor lubrication qualities for the bearings in the engine 8. FIG. 3 is a schematic diagram of a fuel delivery system 28, shown in dashed line, according to a possible embodiment of the invention that shares the components of the prior art fuel delivery system 14 described above in connection with FIG. 2. The fuel delivery system 28 further comprises an independent fuel lubrication additive injection system 30, shown in dashed line.

The injection system 30 comprises a pressurised fuel lubricant additive container 32. The container 32 stores a fuel lubricant additive that is suitable for mixing with the fuel stored in the tank 16, such as TCP. One possible way of keeping the container 32 pressurised is with compressed air developed by the engine 8, as shown in FIG. 3. An engine compressor bleed line 34 connected to a compressor (not shown) in the engine 8 supplies high-pressure air through a check valve 36 and check valve output line 38 to the container 32 in order to keep the contents of the container 32 under pressure. Preferably, an air filter 40 cleans the air that flows through the bleed line 34. Optionally, a pressure relief valve 42 may control the pressurisation of the container 32.

The injection system 30 controls release of the fuel lubricant additive in the container 32 and mixes it into the fuel that flows through the bearing lubrication inlet line 24. FIG. 3 shows one possible means for controlling and mixing the fuel lubricant additive with the fuel to provide suitable lubrication for the bearings in the engine 8. Fuel lubricant additive from the container 32 passes through a flow valve 44, such as a solenoid operated two-way valve, by way of a container outlet line 46 into the bearing lubrication inlet line 24 by way of a valve outlet line 48 to mix with fuel that supplies lubrication to the engine bearings. Preferably, a filter 50 filters the fuel lubricant additive before it mixes with the fuel that supplies fuel to the engine bearings.

An electronic controller 52 may control the operation of the valve 44 to regulate the flow and mixture of fuel lubrication additive with the fuel that flows through the bearing lubrication inlet line 24. The controller 52 may measure flow rate of fuel that passes through the bearing lubrication inlet line 24 and generate a control signal representative of the flow rate to modulate the valve 44 by way of a controller line 54, such as with well-known pulse width modulation (PWM) methods, to control the mixture of fuel lubrication additive with fuel that feeds the engine bearings. The controller 52 may measure the flow directly, or by sensing pressure drop across an orifice 56 as shown in FIG. 3. Alternatively, a pulse solenoid or a burst disc and metered orifice may substitute for the valve 44.

Described above is a fuel lubrication additive injection system for fuel-lubricated gas turbine engines that utilises high-pressure air developed by the engine to transfer stored fuel lubricant additive into the engine fuel stream that lubricates engine bearings. The described embodiment of the invention is only an illustrative implementation of the invention wherein changes and substitutions of the various parts and arrangement thereof are within the scope of the invention as set forth in the attached claims.

What is claimed is:

1. A fuel delivery system for a gas turbine engine that delivers fuel to a combustor of the engine and lubricates bearings of the engine with fuel, comprising:
   a tank for storing the fuel;
   a pump for delivering a continuous flow of fuel from the tank to the combustor by way of a combustor inlet stream and the engine bearings by way of a bearing lubrication inlet stream;
   a pressurised container for storing fuel lubrication additive under pressure; and
   a flow valve for controlling flow of fuel lubrication additive that flows from the pressurised container into the bearing lubrication inlet stream to mix with the fuel delivered to the engine bearings.

2. The fuel delivery system of claim 1, wherein the engine supplies high-pressure air to pressurise the container.

3. The fuel delivery system of claim 2, wherein the engine has an air compressor that supplies the high-pressure air.

4. The fuel delivery system of claim 1, wherein the flow valve modulates the flow of fuel lubricant additive in response to the flow rate of the fuel delivered to the engine bearings.

5. The fuel delivery system of claim 4, wherein the flow valve comprises a solenoid operated two-way valve.

6. The fuel delivery system of claim 5, further comprising an electronic controller that operates the flow valve.

7. The fuel delivery system of claim 4, wherein the flow valve comprises a pulse solenoid.

8. The fuel delivery system of claim 4, wherein the flow valve comprises a burst disc and metered orifice.

9. The fuel delivery system of claim 1, wherein a compressor for the engine supplies high-pressure air to pressurise the container.

10. The fuel delivery system of claim 1, wherein the fuel comprises a high-density hydrocarbon propellant fuel.

11. The fuel delivery system of claim 10, wherein the high-density hydrocarbon fuel comprises exo-tetrahydrodicyclopentadiene.

12. The fuel delivery system of claim 10, wherein the fuel lubrication additive comprises tricresyl phosphate.

13. A fuel delivery system for a gas turbine propulsion engine that delivers fuel to a combustor of the engine and lubricates bearings of the engine with high-density hydrocarbon fuel, comprising:
   a tank for storing the fuel;
   a pump for delivering a continuous flow of fuel from the tank to the combustor by way of a combustor inlet stream and the engine bearings by way of a bearing lubrication inlet stream;
   a pressurised container coupled to an air compressor in the propulsion engine for storing fuel lubrication additive under pressure;
   an electronic controller that measures flow rate of fuel that lubricates the engine bearings and generates a control signal representative of the flow rate; and
   a flow valve that modulates the flow of fuel lubricant additive that flows from the pressurised container into the bearing lubrication inlet stream to mix with the fuel delivered to the engine bearings in response to the control signal.

14. The fuel delivery system of claim 13, wherein the high-density hydrocarbon fuel comprises exo-tetrahydrodicyclopentadiene.

15. The fuel delivery system of claim 13, wherein the fuel lubrication additive comprises tricresyl phosphate.

16. A propulsion engine system comprising:
   a gas turbine engine that generates power from a hydrocarbon fuel comprising a combustor fired by the fuel and bearings lubricated by the fuel;
   a tank for storing the fuel;
   a pump for delivering a continuous flow of fuel from the tank to the combustor by way of a combustor inlet stream and the engine bearings by way of a bearing lubrication inlet stream;
   a pressurised container for storing fuel lubrication additive under pressure; and
   a flow valve for controlling flow of fuel lubrication additive that flows from the pressurised container into the bearing lubrication inlet stream to mix with the fuel delivered to the engine bearings.

17. The propulsion engine system of claim 16, wherein the engine supplies high-pressure air to pressurise the container.

18. The propulsion engine system of claim 17, wherein the engine has an air compressor that supplies the high-pressure air.

19. The propulsion engine system of claim 16, wherein the flow valve modulates the flow of fuel lubricant additive in response to the flow rate of the fuel delivered to the engine bearings.

20. The propulsion engine system of claim 19, wherein the flow valve comprises a solenoid operated two-way valve.

21. The propulsion engine system of claim 20, further comprising an electronic controller that operates the flow valve.

22. The propulsion engine system of claim 19, wherein the flow valve comprises a pulse solenoid.

23. The propulsion engine system of claim 19, wherein the flow valve comprises a burst disc and metered orifice.

24. The propulsion engine system of claim 16, wherein a compressor for the engine supplies high-pressure air to pressurise the container.

25. The propulsion engine system of claim 16, wherein the fuel comprises a high-density hydrocarbon propellant fuel.

26. The propulsion engine system of claim 25, wherein the high-density hydrocarbon fuel comprises exo-tetrahydrodicyclopentadiene.

27. The propulsion engine system of claim 25, wherein the fuel lubrication additive comprises tricresyl phosphate.

28. A propulsion engine system comprising:
- a gas turbine engine that generates power from the fuel comprising a combustor and bearings;
- a tank for storing fuel for the engine;
- a pump for delivering the fuel from the tank to the engine combustor by way of a combustor inlet stream and the engine bearings by way of a bearing lubrication inlet stream;
- a pressurised container coupled to an air compressor in the propulsion engine for storing fuel lubrication additive under pressure;
- an electronic controller that measures flow rate of fuel that lubricates the engine bearings and generates a control signal representative of the flow rate; and
- a flow valve that modulates the flow of fuel lubricant additive that flows from the pressurised container into the bearing lubrication inlet stream to mix with the fuel delivered to the engine bearings in response to the control signal.

29. The propulsion engine system of claim 28, wherein the high-density hydrocarbon fuel comprises exo-tetrahydrodicyclopentadiene.

30. The propulsion engine system of claim 28, wherein the fuel lubrication additive comprises tricresyl phosphate.

* * * * *

UNITED STATES PATENT AND TRADEMARK OFFICE
CERTIFICATE OF CORRECTION

| | | |
|---|---|---|
| PATENT NO. | : 7,640,723 B2 | Page 1 of 1 |
| APPLICATION NO. | : 11/305608 | |
| DATED | : January 5, 2010 | |
| INVENTOR(S) | : Eric J. Alexander | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1054 days.

Signed and Sealed this

Sixteenth Day of November, 2010

David J. Kappos
*Director of the United States Patent and Trademark Office*